UNITED STATES PATENT OFFICE.

JAKOB SCHMID AND JACQUES BACHELUT, OF BASLE, SWITZERLAND, ASSIGNORS TO THE SOCIETY OF CHEMICAL INDUSTRY IN BASLE, OF SAME PLACE.

BLUE BASIC DYE.

SPECIFICATION forming part of Letters Patent No. 525,627, dated September 4, 1894.

Application filed June 2, 1894. Serial No. 513,306. (Specimens.) Patented in Germany December 10, 1892, No. 71,370; in France December 28, 1892, No. 226,762, and in England January 16, 1893, No. 957.

*To all whom it may concern:*

Be it known that we, JAKOB SCHMID, a subject of the Queen of Great Britain, and JACQUES BACHELUT, a citizen of France, both residing at Basle, Switzerland, have invented new and useful Improvements in the Production of Blue Basic Coloring-Matters or Dye-Stuffs, (for which Letters Patent have been obtained in Germany, dated December 10, 1892, No. 71,370; in France, dated December 28, 1892, No. 226,762, and in England, dated January 16, 1893, No. 957,) of which the following is a specification.

Our invention relates to the manufacture of new and valuable blue basic coloring matters by condensation of two molecules of monoalkyl-orthotoluidin, with one molecule of dichlorbenzaldehyde, (described in the German Patent No. 32,238,) in presence of a condensing agent, such as, chlorhydric acid, or sulfuric acid, or chlorid of zinc, &c., and oxidation of the thus obtained leuco compounds of the general formula:

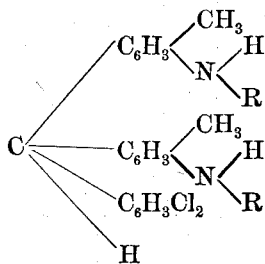

(R represents alkyl-groups such as methyl or ethyl). The thus obtained coloring matters dye bright blue tints on wool and silk as well as on cotton mordanted with tannin and tartar emetic.

*Example I. Condensation.*—The production of symmetrical dimethyl-diamido-ortho-ditolyl-dichlorphenyl-methane may be effected for example as follows: (The parts are by weight.) Sixty parts of monomethyl-ortho-toluidin, forty-four parts of dichlorbenzaldehyde, sixty parts of alcohol and twenty-five parts of sulfuric acid are heated during twenty-four hours on the water-bath in an enameled vessel. The mass of the reaction is supersaturated with soda lye, after which the unaffected oils are expelled by means of water vapor and the remaining leuco base is washed and dried. Analogous leuco compounds may be produced by substituting in the above mentioned example for mono-methyl-ortho-toluidin the equivalent quantity of mono-ethyl-ortho-toluidin. Instead of sulfuric acid any other dehydrating agent such as muriatic acid or chloride of zinc may be used. The thus obtained colorless leuco compounds crystallize from alcohol and dissolve easily in ether, benzene, warm alcohol and dilute mineral acids.

*Example II. Oxidation.*—The leuco compound may be converted into the coloring matter according to the well known process used in the malachite green series, for example: Thirty parts of symmetrical dimethyl-diamido-ortho-ditolyl-dichlor-phenyl-methane are dissolved in forty parts of muriatic acid and fifteen hundred parts of water. To this solution the equivalent quantity of peroxid of lead in paste or another suitable oxidizing agent, is added. The coloring matter is immediately formed and precipitated in the usual way in the form of the double salt of zinc-chlorid and purified by redissolving in hot water. It is a glittering powder, which has a bronze luster and is difficultly soluble in cold water, easily soluble in boiling water and alcohol with a bright blue coloration, insoluble in ether and benzine, easily soluble in concentrated sulfuric acid with a yellow coloration which turns green on addition of water; the aqueous solutions coagulate after cooling. The new dyestuff produces intense greenish-blue tints on wool, silk and cotton, the latter treated with tannin and tartar emetic. In an analogous manner a coloring matter with similar properties results from symmetrical diethyl-diamido-ortho-ditolyl dichlor-phenyl-methane.

What we claim as new, and desire to secure by Letters Patent, is—

The blue basic coloring matter which can be derived from the leuco compound of the general formula:

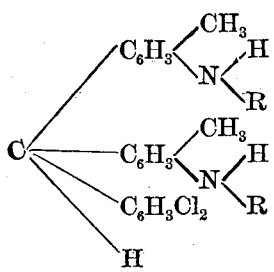

by oxidation and separation, forming a bronze glittering powder, easily soluble in boiling water and alcohol with a bright blue coloration, insoluble in ether and benzene, easily soluble in concentrated sulfuric acid with a yellow coloration which turns green on addition of water; the aqueous solutions coagulate after cooling.

In testimony whereof we have hereunto set our hands in the presence of two subscribing witnesses.

JAKOB SCHMID.
JACQUES BACHELUT.

Witnesses:
GEORGE GIFFORD,
THEODORE H. ACHELER.